US006939585B1

(12) United States Patent
Mizuta (10) Patent No.: US 6,939,585 B1
(45) Date of Patent: Sep. 6, 2005

(54) LIQUID PRESSURE TRANSFER METHOD FOR LOOP-LIKE WORKPIECE AND PRODUCT DECORATED THEREBY

(75) Inventor: Yoshihito Mizuta, Shizuoka (JP)

(73) Assignee: Cubic Co., Ltd., Shizuoka (JP)

( * ) Notice: Subject to any disclaimer, the term of this patent is extended or adjusted under 35 U.S.C. 154(b) by 0 days.

(21) Appl. No.: 09/594,794

(22) Filed: Jun. 16, 2000

(30) Foreign Application Priority Data

Jun. 18, 1999 (JP) ................................. 11-173358
Jun. 6, 2000 (JP) ............................. 2000-169325

(51) Int. Cl.[7] .............................................. B05D 1/18
(52) U.S. Cl. ............................. 427/434.3; 427/430.1; 118/402; 118/416; 156/277; 156/384
(58) Field of Search .................... 427/430.1, 434.3; 156/238, 240, 277, 285, 384; 118/402, 416

(56) References Cited

U.S. PATENT DOCUMENTS 6,022,438 A 2/2000 Watanabe et al. ........... 156/230
6,214,154 B1 * 4/2001 Cho ........................... 156/285

FOREIGN PATENT DOCUMENTS

DE 19824544 12/1998
GB 2001908 2/1979

OTHER PUBLICATIONS

Patent Abstracts of Japan, vol. 010, No. 151 (M-483), May 31, 1986 & JP 61005981 A (Moruten:KK;Others; 01), Jan. 11, 1986.

* cited by examiner

Primary Examiner—Timothy Meeks
Assistant Examiner—David Turocy
(74) Attorney, Agent, or Firm—Wenderoth, Lind & Ponack, L.L.P.

(57) ABSTRACT

Liquid pressure transfer capable of applying a decorative pattern to a loop-like workpiece with satisfactory reproducibility. The workpiece is immersed in a transfer liquid to apparently cut crosswise by a surface of the transfer liquid at a transfer initiating site. Also, the workpiece is substantially concurrently contacted on a circumference of a section thereof taken substantially in a thickness direction thereof with a transfer film at the transfer initiating site. The workpiece is shifted at the transfer initiating site so as to be continuously immersed in the transfer liquid in a longitudinal direction of the workpiece while an attitude of immersion of the workpiece is maintained. At least one of the workpiece and transfer film is transferred during the immersion. Thus, a portion of the transfer film which has not yet been used for transfer printing is fed so as to surround the whole circumference of the section of the workpiece, to thereby ensure transfer of the transfer pattern to the surface of the workpiece.

14 Claims, 10 Drawing Sheets

FIG. 11

LIQUID PRESSURE TRANSFER METHOD FOR LOOP-LIKE WORKPIECE AND PRODUCT DECORATED THEREBY

BACKGROUND OF THE INVENTION

This invention relates to a liquid pressure transfer method for applying a pattern for decoration to a loop-like member such as an annular member forming a closed loop like a steering wheel for an automobile or a U-shaped member forming an open loop like a chair back and a product decorated by the liquid pressure transfer method.

A steering wheel for an automobile has a core made of a metal material so as to exhibit strength at a predetermined level. The core is provided therearound with a grip surface section, which is formed of a material such as a plastic material, a wooden material, a leather material or the like which is selected depending on desired requirements, such as operability of the steering wheel, decorative characteristics thereof and the like. For example, a steering wheel provided thereon with a wooden surface section is evaluated as being a high-quality article, because it exhibits both satisfactory operability and decorative characteristics and requires considerable labor and time to manufacture. However, a recent tendency to reconsider casual use of natural materials in view of the need to protect the natural environment and the demand for reduction in manufacturing cost has lead to development of liquid pressure transfer techniques for substituting a plastic steering wheel material for a wooden steering wheel material and carrying out liquid pressure transfer of a woodgrain pattern for decoration on the plastic steering wheel material.

Application of a decorative pattern to a workpiece by liquid pressure transfer permits formation of a natural pattern which exhibits satisfactory conformability to a configuration of the workpiece, resulting in it being extensively practiced on a variety of workpieces. However, application of such liquid pressure transfer to, for example, a steering wheel encounters some important problems. A conventional steering wheel made of a wooden material is manufactured by subjecting two wooden rod-like materials which are semicircular in section to a treatment by moistening, heating and the like, to thereby bend them into an annular shape and then bonding them to each other while interposing a core therebetween. Thus, of course the wooden materials are each so arranged that a straight grain extends in a circumferential direction of the steering wheel. Such arrangement of the straight grain permits a user to have a sense of security and a sense of reliability.

The assignee proposed techniques for applying decoration to a steering wheel by liquid pressure transfer as disclosed in Japanese Patent Application Laid-Open Publication No. 329498/1998 entitled "A Method for Manufacturing a Steering Wheel to which Liquid Pressure Transfer Printing is Applied". Unfortunately, the proposed techniques fail to exactly reproduce a straight grain pattern in a circumferential direction of the steering wheel or a longitudinal direction of a workpiece. Thus, in order to exactly reproduce a pattern of a natural material or the like on a workpiece having either an annular closed loop or a U-shaped open loop, it is required to transfer a transfer pattern to the workpiece without any distortion, therefore, further development on the liquid pressure transfer is still desired.

SUMMARY OF THE INVENTION

The present invention has been made in view of the foregoing disadvantage of the prior art.

Accordingly, it is an object of the present invention to provide a liquid pressure transfer method which is capable of applying a decorative pattern to a loop-like workpiece with satisfactory reproducibility.

It is another object of the present invention to provide a product decorated by the above-described liquid pressure transfer method.

In accordance with one aspect of the present invention, a liquid pressure transfer method carries out liquid pressure transfer printing on a loop-like workpiece. The liquid pressure transfer method includes the step of supporting a transfer film on a surface of a transfer liquid while floating it thereon. The transfer film has a transfer pattern for decoration printed thereon. The liquid pressure transfer method also includes the step of downwardly immersing the workpiece in the transfer liquid to transfer the transfer pattern to a surface of the workpiece to thereby decorate the workpiece. The workpiece is immersed in the transfer liquid to be apparently cut crosswise by the surface of the transfer liquid at a transfer initiating site. Also, the workpiece is substantially concurrently contacted on a circumference of a section thereof taken substantially in a thickness direction thereof with the transfer film at the transfer initiating site. The workpiece is shifted at the transfer initiating site so as to be continuously immersed in the transfer liquid in a longitudinal direction of the workpiece while an immersion attitude of the workpiece is maintained. At least one of the workpiece and transfer film is transferred during immersion of the workpiece in the transfer liquid. Thus, a portion of the transfer film which has not yet been used for transfer printing is fed so as to surround the whole circumference of the section of the workpiece taken substantially in the thickness direction thereof, to thereby ensure transfer of the transfer pattern to the surface of the workpiece.

In a preferred embodiment of the present invention, a relative transfer speed between the workpiece and the transfer film is set to permit an immersion rate of the workpiece and a feed rate of the transfer film to be substantially equal to each other.

In a preferred embodiment of the present invention, a deflection angle defined between a loop surface of the workpiece and a relative movement direction of the transfer film is set to be within a range of ±90°.

In a preferred embodiment of the present invention, an immersion attitude angle of a loop surface of the workpiece relative to the surface of the transfer liquid is set to be within a range of ±80° on the basis of an upright position thereof.

In a preferred embodiment of the present invention, the workpiece is constituted by a steering wheel material formed to have a loop-like shape and provided on a part of a circumference thereof with a portion that does not require transfer of the transfer film thereto, designated to a transfer not-required portion. Initial immersion of the steering wheel material in the transfer liquid at the transfer initiating site is started at the transfer not-required portion. The steering wheel is immersed in the transfer liquid as it is rotated while the immersion attitude of the steering wheel material at the transfer initiating site is permitted to be maintained during the transfer of the transfer pattern.

In a preferred embodiment of the present invention, the workpiece is constituted by a steering wheel material. Immersion of the steering wheel material progresses while a site is defined at which the steering wheel material is immersed in the transfer liquid on an upstream side in a transfer direction relative to the transfer film as the transfer initiating site, so that the transfer pattern has a joint line formed on a rear surface of the steering wheel material which is substantially invisible from a driver's seat when the steering wheel is mounted on a vehicle.

The method of the present invention constructed as described above, when the steering wheel is applied as the loop-like workpiece, attains liquid pressure transfer printing which permits the transfer pattern to be satisfactorily applied onto the whole circumference of the section of the steering wheel taken substantially in the thickness direction thereof without causing any distortion of the applied pattern. Also, the method of the present invention permits the joint line of the transfer pattern to be positioned on the rear surface of the steering wheel which is substantially invisible from a driver's seat when the steering wheel is mounted on a vehicle, resulting in the transfer pattern such as a straight grain pattern, a fine check pattern or the like being increased in aesthetic characteristics. Further, the present invention permits the deflection angle and immersion attitude angle to be optimally set depending on a size of each of the transfer pattern and workpiece, a configuration thereof and the like.

In accordance with another aspect of the present invention, a decorated product having a decorative pattern applied thereto is provided by subjecting a workpiece of a loop-like shape to liquid pressure transfer printing. In this printing, the workpiece is downwardly immersed in a transfer liquid, which supports a transfer film having a transfer pattern for decoration printed thereon on a surface thereof while floating it thereon, so that the transfer pattern is applied to the workpiece. The workpiece is surrounded on a circumference of a section thereof taken substantially in a thickness direction thereof by the transfer film at a transfer initiating site. The transfer film is continuously drawn into the transfer liquid in a longitudinal direction of the workpiece at the transfer initiating site. Thus, the workpiece is substantially kept from distorting the transfer pattern in the longitudinal direction of the workpiece, resulting in transfer of the transfer pattern to the workpiece being carried out according to the above-described liquid pressure transfer method.

Thus, the decorated product of the present invention may be effectively practiced in the form of any loop-like article such as a hula hoop, rings in gymnastics, a towel ring, a chair back and the like, in addition to the steering wheel.

BRIEF DESCRIPTION OF THE DRAWINGS

The above and other objects and many of the attendant advantages of the present invention will be readily appreciated as the same become better understood by reference to the following detailed description when considered in connection with the accompanying drawings, wherein.

DETAILED DESCRIPTION OF THE PREFERRED EMBODIMENT

Now, the present invention will be described in detail with reference to the accompanying drawings. First a workpiece to be decorated according to the present invention will be described. Then, a liquid pressure transfer printing apparatus for carrying out liquid pressure transfer printing on such a workpiece will be schematically described. Then, a liquid pressure transfer printing method according to the present invention carried out on a loop-like workpiece will be described together with a manner of operation of the liquid pressure transfer printing apparatus.

A workpiece designated by reference character W in the drawings is formed to have a loop-like configuration as a whole or as a part thereof. Thus, the workpieces W may include a variety of members including, for example, a steering wheel mounted on a vehicle, as well as products of an annular shape, a substantially O-shape or the like which form a closed loop such as a hula hoop, rings in gymnastics, a towel ring and the like and products of a substantially U-shape which form an open loop such as a chair back and the like. In addition to the above, the workpieces W may also include products such as a handrail for stairs and the like wherein two loop-like members are connected together through two straight members.

A workpiece such as a steering wheel or the like which forms a closed loop is generally formed to have a continuous circular shape or the like. Thus, in connection with a workpiece of a closed loop, the term "longitudinal direction of workpiece" used herein indicates a circumferential direction in which the workpiece extends. A workpiece such as a chair back or the like which forms an open loop is generally formed to have a shape which permits both ends of the loop to extend in a manner like a substantially straight line. Thus, in connection with a workpiece of an open loop, the term "longitudinal direction of workpiece" indicates a direction in which the workpiece extends from one of the ends thereof, through a loop section, to the other end. Also, a loop surface of the workpiece W is designated by reference character R. Also, the illustrated embodiment will be described essentially in connection with the case where the present invention is applied to a steering wheel as the workpiece W. Thus, when it is required to distinguish a steering wheel before the liquid pressure transfer printing of the present invention is applied thereto and that after the transfer printing is applied thereto from each other, a steering wheel which has been subjected to the liquid pressure transfer printing is designated by reference character 1 and that before the printing is designated by 1A.

Figure 2A:
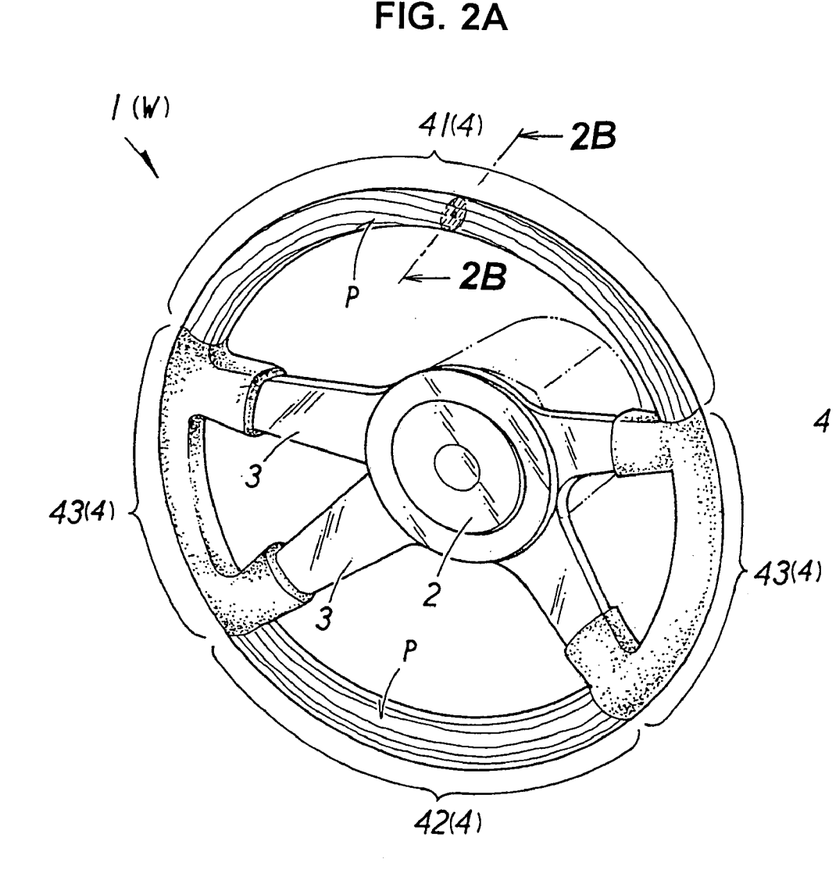
FIG. 2A is a perspective view showing a steering wheel as an example of a decorated product according to the present invention.

Now, the steering wheel 1 which has been subjected to the liquid pressure transfer printing will be described with reference to FIGS. 2A and 2B by way of example. The steering wheel 1 includes a boss section 2 acting as a center of rotational movement of the steering wheel 1, spoke sections 3 arranged so as to radially extend from the boss section 2, and a rim section 4 connected to a distal end of each of the spoke sections 3 and formed to have a substantially annular shape. The rim section 4, as shown in FIG. 2A, includes a long rim portion 41 of an elongated arcuate shape (positioned on an upper side in FIG. 2A), a short rim portion 42 of a short arcuate shape (positioned on a lower side in FIG. 2A), and two grip portions 43 (positioned on both lateral sides in FIG. 2A) for connecting the long rim portion 41 and short rim portion 42 to each other therethrough. The long rim portion 41 and short rim portion 42 have a suitable transfer pattern P such as a woodgrain pattern, a straight grain pattern or the like applied thereto and are formed thereon with a topcoat. The grip sections 43 each have the end or ends of a corresponding one or two of the spoke sections 3 which extend from the boss section 2 connected thereto.

In the illustrated embodiment, the steering wheel 1A is immersed in a transfer liquid and subjected to liquid pressure transfer printing therein while being rotated. In this instance, the spoke sections 3 are arranged close to the grip portions 43, to thereby cause force which is different from that acting on other portions such as the long rim portion 41, short rim portion 42 and the like to act on a transfer film F during the transfer, resulting in that liquid pressure transfer printing like that carried out on other portions cannot be attained on the grip portions 43. Thus, for example, techniques for wrapping a suitable material such as leather or the like around the grip portions 43 may be employed after transfer printing, to thereby hide printing applied to the grip portions 43, or apply a special decoration effect, a grip feel or the like to the grip portions 43. However, unless printing applied to the grip portions 43 adversely affects the appearance of the product or causes any problem, application of such techniques may be eliminated. Also, when it is not desired to apply liquid pressure transfer printing to the grip portions 43, they may be covered with any suitable masking material in advance. A portion such as the grip portion 43 which fails to be satisfactorily subjected to liquid pressure transfer printing in substantially the same manner as the long rim portion 41 and short rim portion 42, resulting in it being typically hidden in the subsequent step, or does not require transfer printing, is referred to as "transfer not-required portion" herein.

Figure 4:
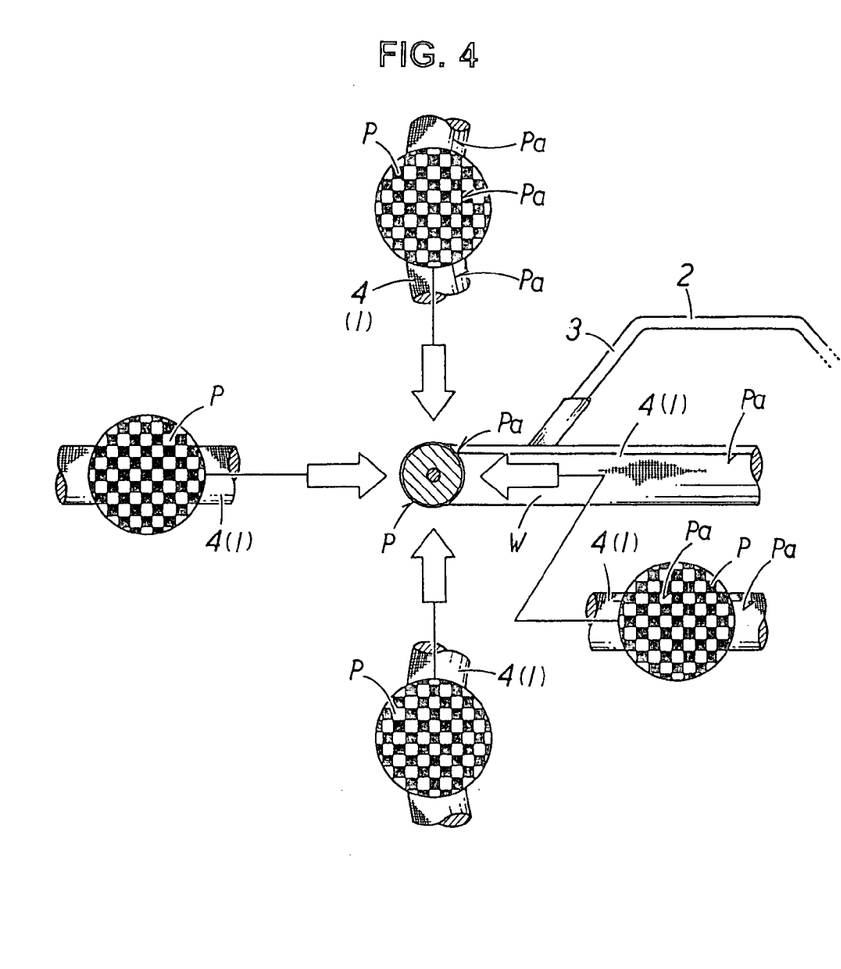
FIG. 4 is a schematic view showing liquid pressure transfer printing applied to a steering wheel which is viewed in four directions around a periphery of the steering wheel.

One of the features of the present invention is that a transfer pattern applied to the long rim portion 41 and short rim portion 42 by liquid pressure transfer printing is markedly decreased in distortion as compared with that obtained in the prior art. As shown in FIG. 4 by way of example, the transfer is carried out to substantially prevent occurrence of pattern distortion on a circumference of a section of the rim section 4 of the workpiece 1, which is taken in a thickness direction thereof perpendicular to the longitudinal direction thereof. FIG. 4 shows a check pattern formed on the long rim 41 or short rim 42 by liquid pressure transfer printing of the present invention, which is viewed in each of four directions around the circumference. As will be noted from FIG. 4, the present invention substantially prevents distortion of the transfer pattern. The transfer pattern P is so formed that a joint line Pa of the transfer pattern P is positioned on a rear surface of the steering wheel 1 which is substantially invisible from a driver's seat when the steering wheel is mounted on a vehicle.

Now, a liquid pressure transfer printing apparatus 10 for carrying out liquid pressure transfer printing on the workpiece will be described with reference to FIG. 1 by way of example. The liquid pressure transfer printing apparatus 10 includes a transfer bath 11, a transfer film feed unit 12, and a workpiece holding and shifting unit 13.

Figure 1:
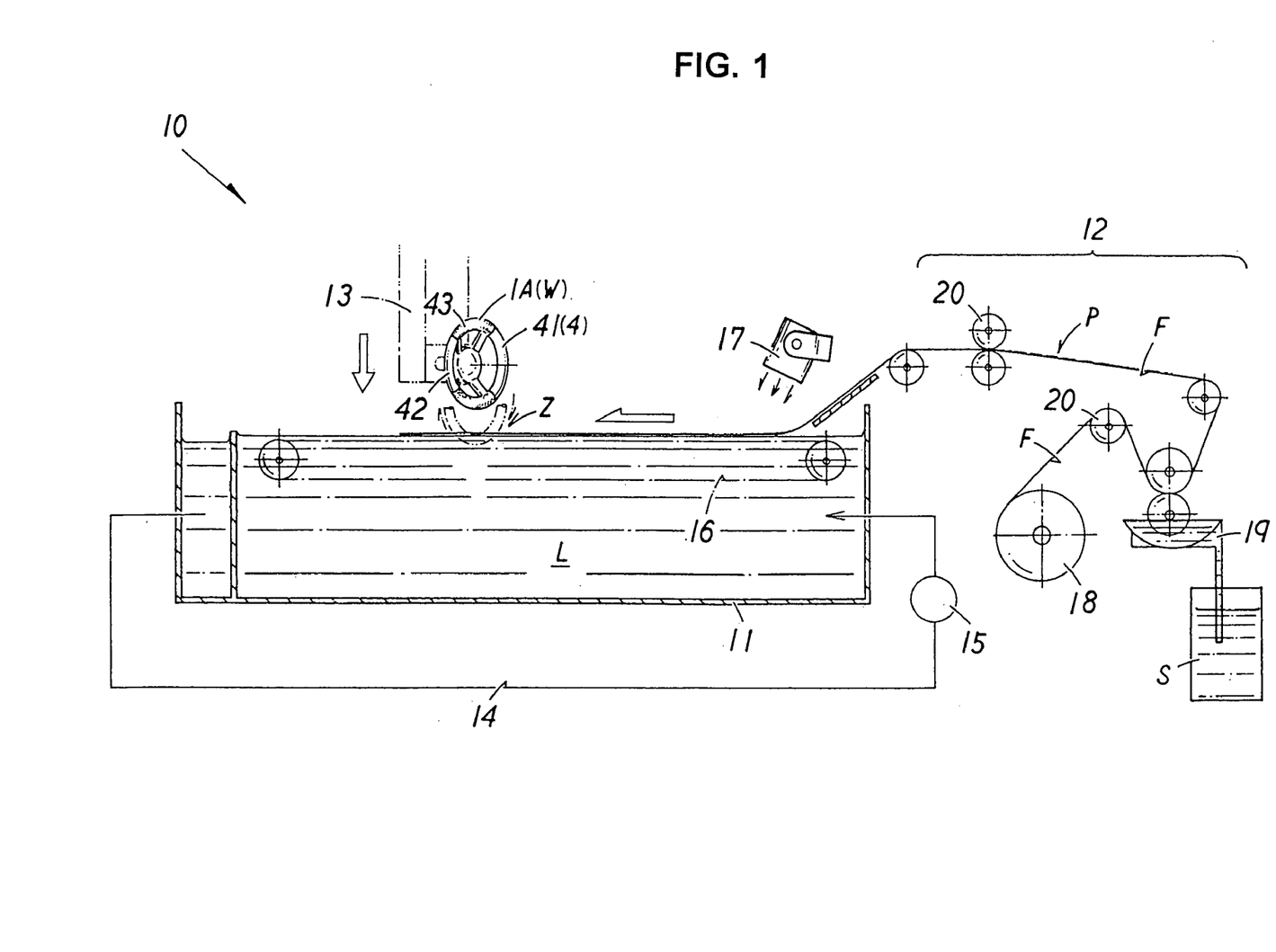
FIG. 1 is a schematic side elevation view showing an apparatus which is adapted to practice a liquid pressure transfer method according to the present invention.

The transfer bath 11 has a transfer liquid L stored therein, which liquid is forcibly circulated at a reduced speed through a circulation pipeline 14 by means of a pump 15 as indicated at an arrow in FIG. 1 by way of example. The transfer bath 11 is provided on each of opposite side ends thereof with a guide chain 16 in a manner to extend between initial and terminal ends of the transfer bath 11 opposite to each other. Also, the transfer bath 11 has a fan unit 17 arranged above the initial end thereof. Circulation of the transfer liquid L, the guide chains 16, the fan unit 17 and the like cooperate with each other to permit a transfer film F supported on a surface of the liquid L while being floated thereon to be stably transferred toward the workpiece W or steering wheel 1A without causing ruffling or waving of the transfer liquid L.

The illustrated embodiment, as described above, is so constructed that the transfer film F is transferred toward the workpiece W or steering wheel 1A. However, the illustrated embodiment is not limited to such construction. For example, the steering wheel 1A may be transferred toward the transfer film F kept stationary on the surface of the transfer liquid L in the transfer bath 11. Alternatively, both steering wheel 1A and transfer film F may be moved together. In the illustrated embodiment, it is merely required that both approach each other. The term "relative movement direction" defined herein in connection with a direction of movement or transfer of the transfer film F covers all of the above-described transfer manners. Further, the term "upstream side in the relative movement direction" defined herein indicates a side on which a transfer film F which has not yet been used for transfer printing is fed with respect to the workpiece W. Thus, it is substantially opposite to a side on which the joint line Pa is formed.

The transfer film feed unit 12 includes a film roll 18 formed by winding the water-soluble transfer film F in a roll-like manner and a solvent tank 19, in which an activator S for providing a dry transfer ink printed on a carrier sheet with stickiness to render it transferable, is stored. Such a treatment with the activator S is referred to as "activation"

herein. The transfer film feed unit 12 also includes feed rollers 20. Such construction permits the transfer film F delivered from the film roll 18 to be activated by the activator S in the solvent tank 19 and then continuously fed to the transfer bath 11. The activator S is made by mixing a resin material, a pigment, a solvent, a plasticizer and the like with each other at a suitable ratio by way of example. Simply, a solvent such as a thinner or the like may be used for this purpose.

Figure 5A:
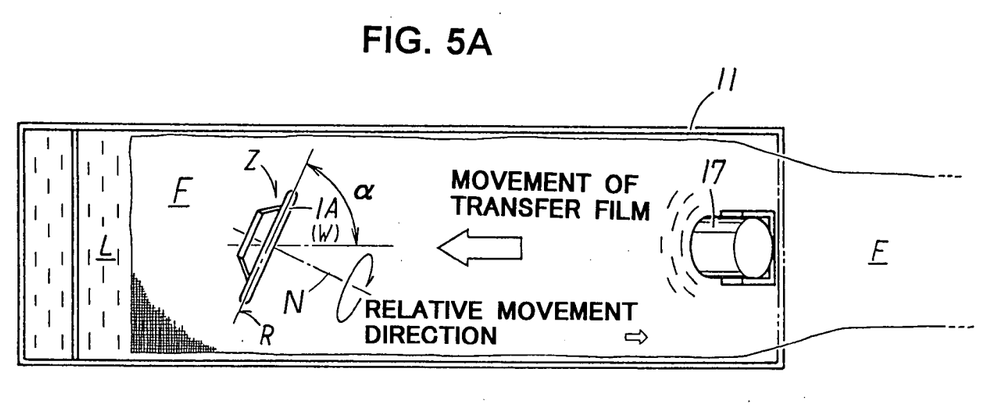
FIGS. 5A and 5B each are a schematic plan view showing immersion of a steering wheel in a transfer liquid in a direction perpendicular to a surface of the transfer liquid.
Figure 6A:
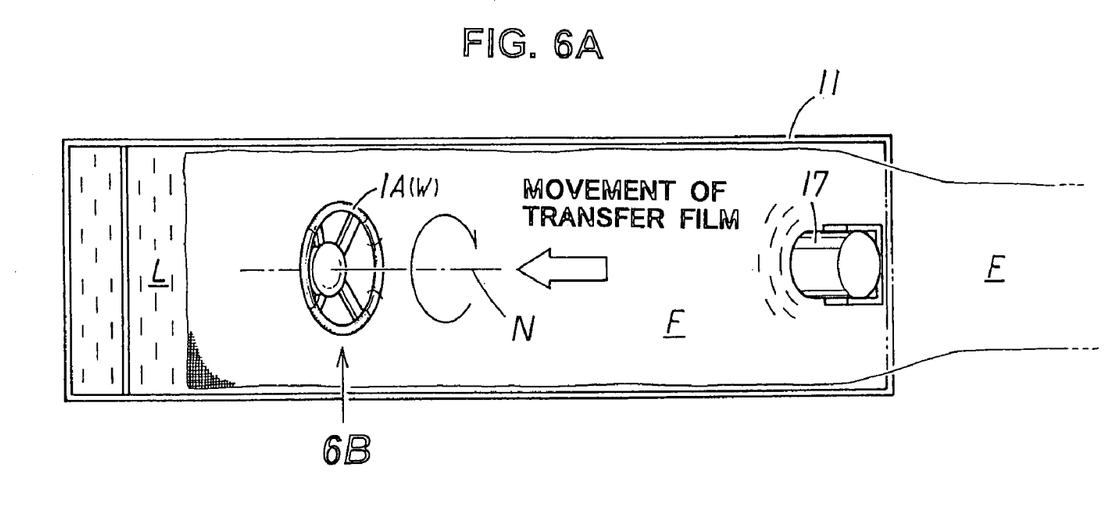
FIG. 6A is a schematic plan view showing immersion of a steering wheel in a transfer liquid in a direction substantially perpendicular to a direction of relative movement between the steering wheel and a transfer film.
Figure 6B:
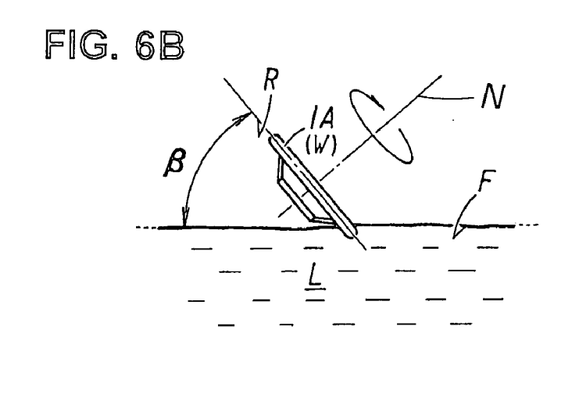
FIG. 6B is a side elevation view of the steering wheel as viewed in a direction 6B in FIG. 6A.

The workpiece holding and shifting unit 13 is constructed so as to immerse the steering wheel 1A in the transfer liquid L while holding it thereon and then rotate the steering wheel 1A to shift it in the longitudinal direction of the steering wheel 1A or workpiece W. Immersion of the workpiece W or steering wheel 1A in the transfer liquid L by the workpiece holding and shifting unit 13 is carried out so that a deflection angle α defined between the loop surface R of the steering wheel 1A and the relative movement direction of the transfer film F may be suitably set to be within a range of ±90° on the basis of the relative movement direction as shown in FIG. 5A. Alternatively, an immersion attitude angle β of the loop surface R relative to the surface of the transfer liquid L may be suitably set to be within a range of ±80 on the basis of an upright position of the workpiece as shown in FIGS. 6A and 6B. In this connection, the symbols "+" and "−" referred to in connection with the deflection angle or immersion attitude angle herein do not have any specific definition. Thus, they merely mean that when any one of rotational directions of the workpiece from a certain reference position is indicated by "+", the other rotational direction is indicated by "−".

Figure 5B:
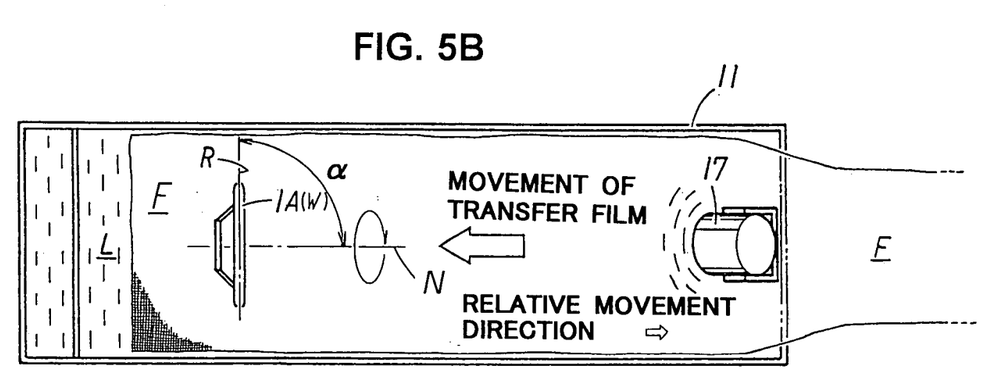
Figure 7A:
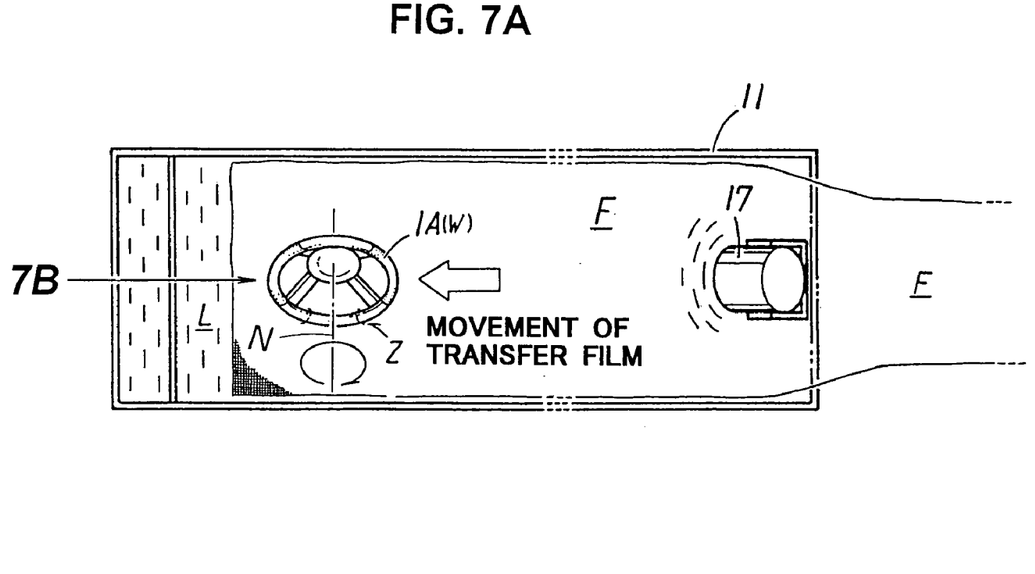
FIG. 7A is a schematic plan view showing immersion of a steering wheel in a transfer liquid in a direction of relative movement between the steering wheel and a transfer film.
Figure 7B:
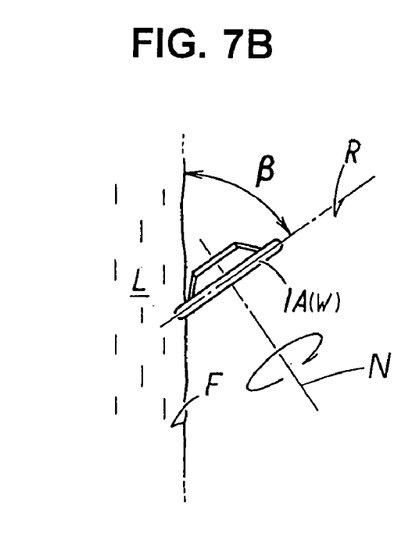
FIG. 7B is a front elevation view of the steering wheel as viewed in a direction 7B in FIG. 7A.

In each of FIGS. 5A and 5B, the steering wheel 1A is immersed in the transfer liquid L while being kept substantially erect or upright with respect to the surface of the transfer liquid L, or keeping the immersion attitude angle β at substantially 90 degrees, wherein the deflection angle α is set to be about 65 degrees in FIG. 5A and about 90 degrees in FIG. 5B. Also, in FIGS. 6A and 6B, the immersion attitude angle β is set to be about 50 degrees, and therefore the workpiece W or steering wheel 1A is immersed in the liquid while being inclined at an angle of about 40 degrees on the basis of an upright position thereof. Thus, a normal direction N of the loop surface R as viewed in plan is substantially conformed to the relative movement direction of the transfer film F, resulting in the deflection angle α being about 90 degrees. Further, in FIGS. 7A and 7B, the immersion attitude angle β is set to be about 55 degrees, resulting in the steering wheel 1A being inclined at an angle of about 35 degrees on the basis of an erect position thereof. Thus, the normal direction N of the loop surface R as viewed in plan is rendered substantially perpendicular to the relative movement direction of the transfer film F, resulting in the deflection angle α being about 0 degree.

In FIG. 1, the steering wheel 1A is shown as if it is vertically downwardly immersed in the transfer liquid. Alternatively, the steering wheel 1A may be obliquely lowered by means of a conveyor of an inverted triangular shape, an articulated robot or the like. Also, in FIG. 1, the transfer film F is fed to the transfer bath 11 after it is coated with the activator S. Alternatively, the transfer film F may be fed to the transfer bath 11 and then have a solvent or the like applied thereto for activation thereof. Further, in FIG. 1, the film F is continuously fed to the transfer bath 11 in which the transfer liquid L is circulated. Alternatively, individual transfer films F may be manually fed one by one to the transfer bath 11 in which the transfer liquid L is kept stationary so that they may be floated on the transfer liquid L.

Now, liquid pressure transfer printing carried out on the loop-like workpiece will be described in relation to operation of the liquid pressure transfer printing apparatus 10 constructed as described above.

(1) Feeding of Transfer Film:

The transfer film F delivered from the film roll 18, as shown in FIG. 1, is coated on the surface thereof having the transfer ink deposited thereon with the activator S and then fed onto the transfer liquid L in the transfer bath 11. The transfer film F thus coated thereon with the activator S absorbs water, to thereby be softened and swollen, resulting in it being somewhat expanded in all directions. Coating of the activator on the transfer film F is carried out for the reason that the transfer film F is required to be normally kept dry because it is stored in the form of the film roll. Thus, the coating permits the ink coated surface of the transfer film F to be provided with stickiness. Alternatively, coating of the activator S on the transfer film F may be carried out after feeding of the transfer film F onto the transfer liquid L as well.

Figures 3A, 3B, 3C:
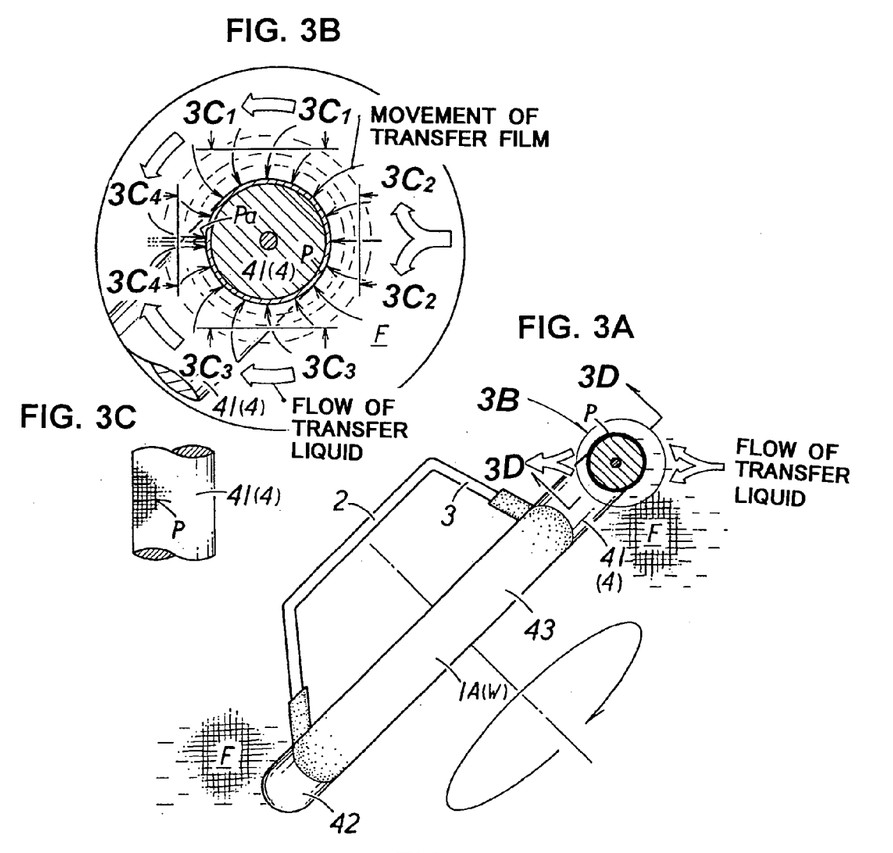
FIG. 3A is a plan view partly in section showing a steering wheel to which printing is applied according to a liquid pressure transfer method of the present invention.
FIG. 3B is an enlarged view of a portion 3B of FIG. 3A.
FIG. 3C is a view along line $3C_1$—$3C_1$, $3C_2$—$3C_2$, $3C_3$—$3C_3$ or $3C_4$—$3C_4$ as viewed in a direction of the arrows.
Figure 3D:
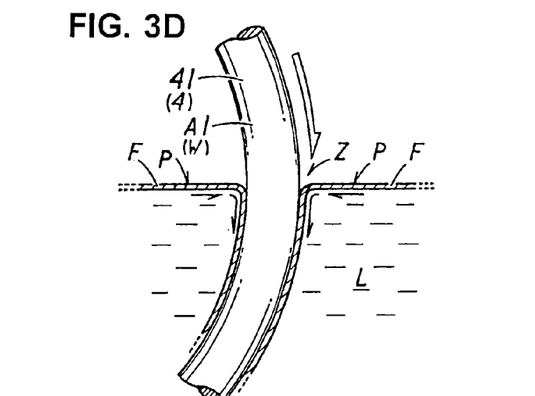
FIG. 3D is a fragmentary schematic view partly in section taken along line 3D—3D of FIG. 3A.

(2) Feeding of Steering Wheel:

The workpiece W or steering wheel 1A is initially immersed in the transfer liquid while being so set that a front surface thereof defined at the time when it is mounted on a vehicle, is kept facing the transfer film F relatively approaching the steering wheel. At this time, immersion of the steering wheel 1A in the transfer liquid L is carried out while keeping the deflection angle and immersion attitude angle suitably set depending on conditions such as the size of the transfer pattern, the size of the steering wheel, the thickness of the steering wheel and the like. The initial immersion is started at the transfer not-required portion such as the grip portions 43 or the like. At this time, when undesired transfer is possibly carried out on parts of the long rim portions 41 and short rim portions 42 close to the transfer not-required portion, the parts may be covered with a masking material or the like to prevent the undesired transfer. During the immersion, the steering wheel 1A, as shown in FIGS. 3A and 3B by way of example, has the rim section 4 apparently cut crosswise by the surface of the transfer liquid L. In other words, the rim section 4 has a whole circumference of a section thereof which is taken substantially in a thickness direction thereof substantially concurrently contacted with the transfer film F.

(3) Rotation of Steering Wheel:

After initial immersion of the steering wheel 1A, the workpiece holding and shifting unit 13 rotates the steering wheel 1A at a low speed to continuously immerse the steering wheel A in the transfer liquid L in the longitudinal direction thereof, resulting in the steering wheel gradually being subjected to liquid pressure transfer printing. Immersion of the steering wheel 1A in the transfer liquid L is carried out at two sites thereof. In this connection, the liquid pressure transfer printing is carried out at one of the immersion sites or a site of the steering wheel which is immersed in the surface of the transfer liquid L on the upstream side in the relative movement direction of the transfer film F or at a site thereof which is initially contacted with the transfer film F. The site is referred to as a transfer initiating site Z herein. At the transfer initiating site Z, the transfer film F is gradually downwardly drawn into the transfer liquid with rotation of the steering wheel 1A to generate a liquid pressure, which acts to subject the steering wheel to liquid pressure transfer printing. At the other of the two immersion sites, the rim section 4 is gradually drawn out of the surface of the transfer liquid L, to thereby fail to generate the liquid pressure, resulting in the steering wheel being kept from printing. At the transfer initiating site Z, it is required to constantly replenish a circumference of the rim section 4 with a portion of the transfer film F which has not yet been used for transfer printing, so that a relative transfer speed of the transfer film F and a rotational speed of the steering wheel 1A are set to be substantially equal to each other.

(4) Progress of Liquid Pressure Transfer Printing and Formation of Joint Line:

Progress of the liquid pressure transfer printing and formation of the joint line will be now described. As described above, in the present invention, it is carried out to constantly feed a portion of the transfer film F which has not yet been used for transfer printing to the circumference of the section of the rim section 4 defined in the thickness direction thereof, to thereby remarkably restrain distortion of the transfer pattern as compared with the prior art. As shown in FIG. 4 by way of example, the rim section 4 substantially escapes from distortion of the transfer pattern applied thereto as viewed in all directions around the circumference of the rim section 4.

Figure 2B:
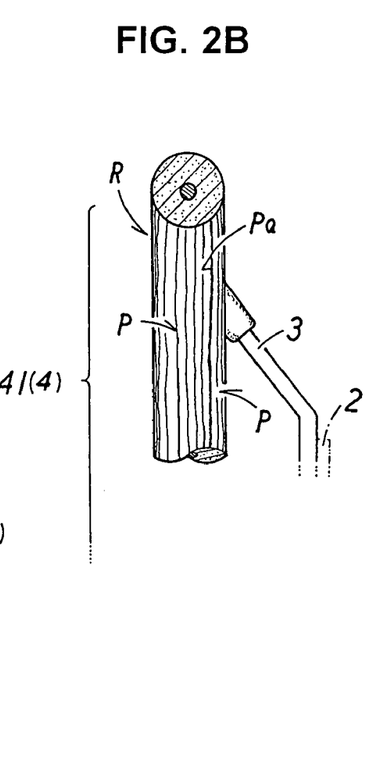
FIG. 2B is a sectional view taken along line 2B—2B of FIG. 2A.

Also, suitable setting of the deflection angle and immersion attitude angle permits the joint line Pa of the transfer pattern P to be positioned on the rear surface of the steering wheel which is substantially invisible from a driver's seat when the steering wheel is mounted on a vehicle, as shown in FIGS. 2B and 3B by way of example, resulting in the joint line Pa being substantially inconspicuous.

After termination of rotation of the steering wheel 1A, the steering wheel 1A is removed from the surface of the transfer liquid L, resulting in the liquid pressure transfer printing being substantially completed.

(5) Removal of Film and Drying:

The steering wheel 1A which has been thus subjected to the liquid pressure transfer printing has a residue of the transfer film F which has not been dissolved in the transfer liquid L adhered thereto. Thus, in order to fully remove the residue, the steering wheel 1A is subjected to washing by showering or the like, followed by drying.

(6) Topcoat:

The steering wheel 1A having the transfer pattern P thus printed thereon provides a decorated product of the present invention. However, when it is desired that a portion of the steering wheel which has been subjected to the liquid pressure transfer printing exhibits increased gloss and depth, it is coated with a transparent topcoat by spraying or the like. The topcoat thus formed may be subjected to polishing by buffing or the like.

Figure 8A:
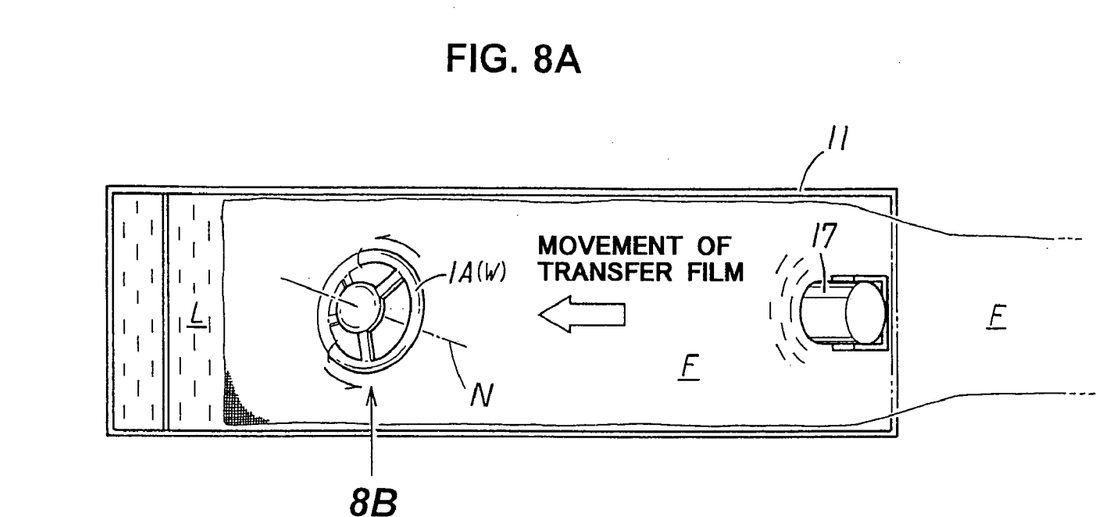
FIG. 8A is a schematic plan view showing relatively satisfactory transfer of a pattern onto a steering wheel.
Figure 8B:
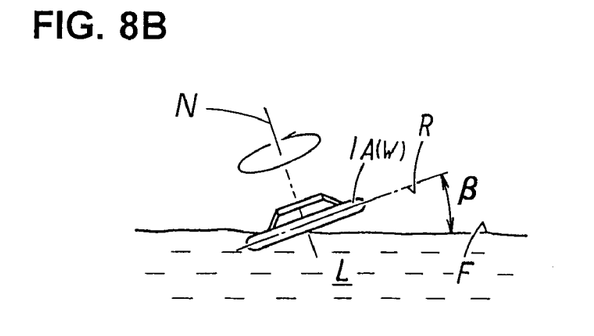
FIG. 8B is a side elevation view of the steering wheel as viewed in a direction 8B in FIG. 8A.

As described above, in the illustrated embodiment, application of a transfer pattern to the workpiece W such as the steering wheel 1A or the like is carried out so as to minimize distortion of the pattern on the circumference of the section of the workpiece taken in the thickness direction thereof. In this connection, the transfer pattern actually obtained is extensively varied due to complicated entangling of a variety of factors including an attitude of the steering wheel 1A (setting of the deflection angle and immersion attitude angle), a feed rate of the transfer film F (relative transfer speed), a size of the workpiece W, a sectional configuration of the workpiece W, viscosity of the activated transfer film F, and the like. Thus, in order to obtain an optimum transfer pattern, it is generally required to employ a method of trial and error to determine a plurality of conditions for the transfer. For example, as shown in FIGS. 8A and 8B, a satisfactory transfer pattern may be obtained when the immersion attitude angle β between the loop surface R and the surface of the transfer liquid L is set to be within a range between −20° and −10° or an angle of the workpiece defined on the basis of an upright position thereof is set to be within a range between −80° and −70° and a normal direction N of the loop surface R as viewed in plan is inclined by an angle of from 10° to 20° or the deflection angle is set to be within a range between 70° and 80°. The reason why the immersion attitude angle β between the loop surface R and the surface of the transfer liquid L is indicated at the symbol "−" is that the workpiece in FIGS. 8A and 8B is inclined in a direction opposite to that shown in FIGS. 6A, 6B and 7A, 7B.

Figure 9:
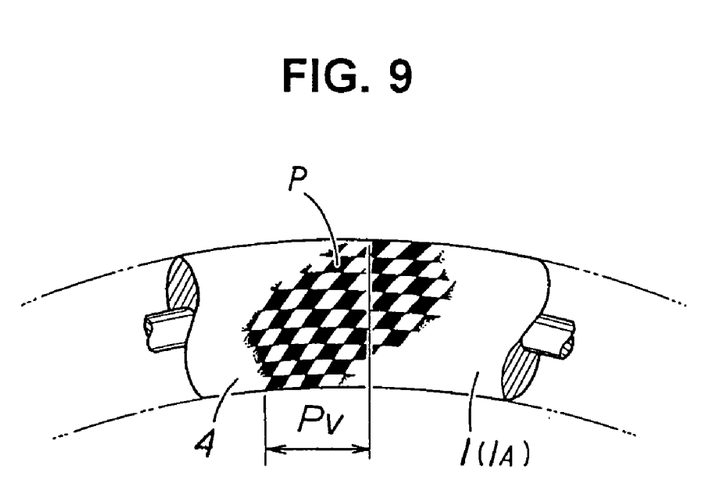
FIG. 9 is a schematic view showing misregistration of a check pattern occurring on a steering wheel in a peripheral direction thereof during liquid pressure transfer of the check pattern.

Satisfactory liquid pressure transfer will now be described. For example, when such a fine check pattern as seen in a fabric made of a carbon fiber (hereinafter referred to as "carbon pattern") is to be transferred to a surface of the steering wheel 1A, it is very difficult to carry out the transfer so as to conform longitudinal lines of the check pattern and lateral lines thereof to a circumferential direction of the rim section 4 and a direction of the section thereof defined in the thickness direction thereof. However, formation of the check pattern in a manner to substantially conform the carbon pattern to the thickness direction of the workpiece W is desirable because it permits the steering wheel 1 to exhibit an appearance increased in aesthetic characteristics. Thus, such liquid pressure transfer as shown in FIG. 9 which reduces misregistration Pv in the transfer pattern P in the circumferential direction of the rim section 4 is considered to be satisfactory.

Figure 10:
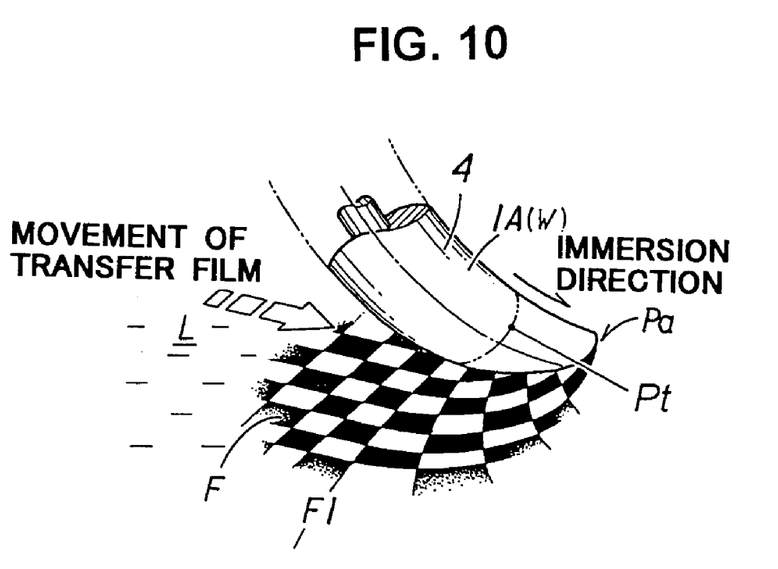
FIG. 10 is a perspective view showing the progress of liquid pressure transfer on a workpiece from an upstream side thereof to a downstream side thereof over the lapse of time.
Figure 11:
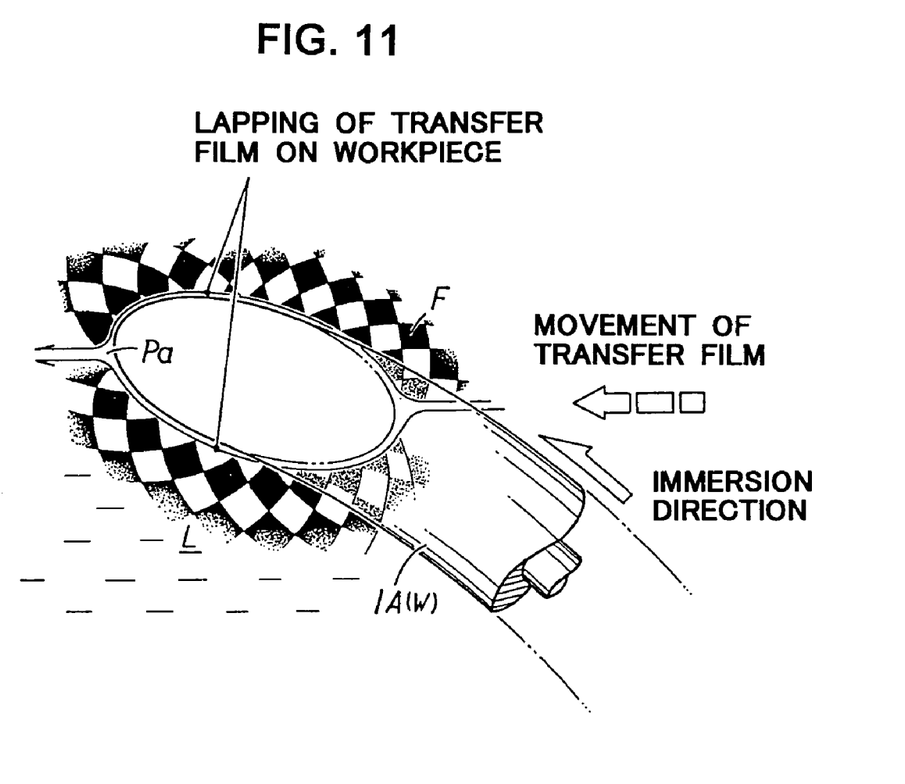
FIG. 11 is a schematic plan view showing lapping of a transfer film divided into two parts by a workpiece on both inner and outer lateral sides of the workpiece.

The joint line Pa of the transfer pattern P formed on the rear surface of the steering wheel 1A is so formed that the transfer film F fed from the upstream side is divided into two parts in a lateral direction thereof by the steering wheel 1A, which parts then lap on inner and outer lateral sides of the steering wheel 1A to the rear side thereof and then are joined to each other in order while being contacted with each other (FIG. 10). Thus, when there occurs any misregistration in lapping of the divided two parts of the transfer film F on the rear side of the workpiece W, such misregistration causes misregistration of the transfer pattern at the joint line Pa, as well as a difference in elongation of the transfer film F, resulting in a difference in gradation being often notedly observed at the joint line Pa. Thus, liquid pressure transfer which reduces a difference in gradation at the joint line Pa is considered to be satisfactory.

The reason why the present invention attains satisfactory liquid pressure transfer will be considered.

(1) Effects of Immersion Attitude Angle:

In the illustrated embodiment, the immersion attitude angle β is set to be within a range between −20° and −10° or an angle of the workpiece defined on the basis of an upright position thereof is set to be within a range between −80° and −70°. This permits the steering wheel 1A to lie substantially along the surface of the transfer liquid L, so that an apparent ring of the steering wheel 1A surrounded by the transfer film F may be rendered elliptic while being substantially flattened. Thus, it is anticipated that the pattern transferred to the surface of the rim section 4 is substantially shifted in a peripheral direction thereof. However, an experiment by the inventor revealed that laying-down of the steering wheel 1A reduces shifting of the pattern in the peripheral direction of the rim section 4.

It is considered that this is due to the fact that transfer of the pattern to the whole circumference of the workpiece W apparently cut crosswise by the surface of the transfer liquid L due to immersion thereof in the transfer liquid starts on the upstream side to which the transfer film F is fed and then continuously progresses to the sides of workpiece W with the progress of lapping of the transfer film F on the workpiece, followed by lapping of the transfer film F on the lower side of the workpiece W, resulting in the joint line Pa being formed on the lower side. Thus, transfer of the transfer pattern P to the workpiece W is not substantially concurrently carried out over the whole circumference of the workpiece W apparently cut crosswise continuously progresses from the upstream side to the downstream side with a certain time difference. Thus, it is considered that transfer of the transfer film F to the workpiece W while keeping it lying on the transfer liquid permits a locus of lapping of the transfer film F on the workpiece W to substantially coincide with the circumference of the section of the workpiece W taken in the thickness direction thereof, to thereby minimize shifting or misregistration of the pattern in the circumferential direction of the rim section 4. This means that the immersion attitude angle and a feed rate of each of the transfer film F and workpiece W are set so as to permit the locus of the lapping of the transfer film on the workpiece W to substantially coincide with the circumference of the section of the workpiece in the thickness direction thereof. In FIG. 10, by way of example, a line substantially normal to a direction of movement of the transfer film F, which is designated by F1, is defined so as to substantially conform to the circumference of the section of the workpiece W in the thickness direction thereof which is indicated by two-dot chain lines Pt.

(2) Effects of Deflection Angle:

Before discussing effects of the deflection angle, elongation or enlargement of the transfer pattern will be considered. In immersion of the workpiece W or steering wheel 1A in the transfer liquid, the outer peripheral side of the steering wheel 1A is increased in immersion speed as compared with the inner peripheral side thereof because the former has a diameter larger than the latter. Thus, it is considered that the pattern is apt to elongate or enlarge on the outer peripheral side as compared with the inner peripheral side. Also, it is considered that the pattern tends to elongate on the downstream side of the steering wheel 1A as compared with the upstream side thereof, because of lapping of the transfer film F on the steering wheel on the downstream side (see FIG. 10). As described above, in the illustrated embodiment, the normal direction N of the loop surface R as viewed in plan is set to be inclined by an angle of 10 to 20 degrees with the relative movement direction of the transfer film F or the deflection angle is set to be 70 to 80 degrees. Such arrangement permits the outer peripheral side of the workpiece W on which elongation of the pattern easily occurs to be positioned on the upstream side, on which the pattern elongation is hard to occur and the inner peripheral side of the workpiece W on which the pattern elongation is hard to occur to be positioned on the downstream side which causes the pattern elongation to be readily occur, resulting in such factors contrary to each other being offset by each other.

Thus, it is considered that in the transfer film F divided into two parts by the workpiece W during the transfer and lapping on the outer and inner lateral sides of the workpiece W to the lower side thereof, the above-described fact permits a distance or time by which the transfer film F laps on the outer lateral side of the workpiece W to the bottom side thereof to be substantially equal to that by which it laps on the inner lateral side to the bottom side, resulting in the pattern elongation on the outer side of the workpiece W and that on the inner side substantially coinciding with each other, so that a difference in gradation at the joint line Pa may be substantially eliminated.

The joint line Pa is positionally varied depending on an attitude of the workpiece W, a feed rate of the transfer film F, a size of the workpiece W, a configuration of the workpiece W, viscosity of the transfer film F activated and the like. This often causes a distance by which the transfer film F laps on the outer lateral side of the workpiece W to the bottom side thereof and that by which it laps on the inner lateral side to the bottom side not to coincide with each other. The illustrated embodiment wherein the steering wheel 1A is applied as the workpiece W permits the joint line Pa to be formed at a position on the workpiece W which is shifted somewhat toward a center of the workpiece W. This would be due to the fact that immersion of the workpiece W is carried out toward the center as viewed in plan and the transfer film F is increased in viscosity.

As can be seen from the foregoing, the present invention in which the steering wheel may be applied as the loop-like workpiece by way of example substantially restrains distortion of a transfer pattern over the whole circumference of the rim section of the steering wheel taken in the thickness direction thereof as compared with the prior art, to thereby permit transfer of the transfer pattern to the steering wheel to be carried out substantially in conformity to the circumference of the rim section. Also, the present invention permits a distance by which the transfer film F divided into two parts laps on the inner lateral side of the steering wheel to the lower side thereof and that by which it laps on the outer lateral side to the lower side to be substantially equal to each other, to thereby render elongation of one of the two parts of the transfer film and that of the other part substantially equal to each other, so that transfer of the pattern on the transfer film to the steering wheel may be attained while substantially eliminating a difference in gradation at the joint line. Further, the present invention permits the joint line of the transfer pattern to be positioned on the rear surface of the steering wheel which is substantially invisible from a driver's seat when the steering wheel is mounted on a vehicle, resulting in the transfer pattern such as a straight grain pattern, a carbon pattern or the like being increased in aesthetic characteristics. In addition, the present invention permits the deflection angle and immersion attitude angle to be optimumly set depending on a size of each of the transfer pattern and workpiece, a configuration thereof and the like.

Moreover, the present invention may be effectively applied to any loop-like article such as a hula hoop, rings in gymnastics, a towel ring, a chair back and the like in addition to the steering wheel.

While preferred embodiments of the invention have been described with reference to the drawings, obvious modifications and variations are possible in light of the above teachings. It is therefore to be understood that within the scope of the appended claims, the invention may be practiced otherwise than as specifically described.

What is claimed is:

1. A liquid pressure transfer method, comprising:
supporting a transfer film on a surface of a transfer liquid by floating the transfer film on the liquid, wherein the transfer film has a transfer pattern for decoration printed thereon;
downwardly immersing a loop shaped workpiece in the transfer liquid so as to transfer the transfer film to a surface of the loop shaped workpiece for decorating the workpiece such that a plane of the surface of the transfer liquid at a transfer initiating site extends through the loop shaped workpiece;
wherein the loop shaped workpiece has a loop shaped direction in which the workpiece extends and a thickness direction which is perpendicular to the loop shaped direction in which the workpiece extends;

wherein said downwardly immersing comprises moving the loop shaped workpiece along the loop shaped direction in which the workpiece extends at the transfer initiating site so as to continuously immerse the loop shaped workpiece in the transfer liquid while maintaining the attitude of the workpiece to the surface of the transfer liquid the same such that a circumference of a cross section of the loop shaped workpiece, taken in the thickness direction of the loop shaped workpiece, is substantially concurrently contacted with the transfer film at the transfer initiating site;

wherein the transfer initiating site is at a position at which a portion of the loop shaped workpiece which is located above the surface of the transfer liquid, with another portion of the loop shaped workpiece immersed in the transfer liquid, is first brought into contact with the transfer film by moving the loop shaped workpiece along the loop shaped direction so as to continuously immerse the loop shaped workpiece in the transfer liquid; and moving at least one of the loop shaped workpiece and the transfer film during said downwardly immersing such that a portion of the transfer film which has not yet been used for transfer printing can be used for transfer printing.

2. The liquid pressure transfer method of claim 1, wherein a relative movement speed between the loop shaped workpiece and the transfer film is set so that an immersion rate of the loop shaped workpiece and a feed rate of the transfer film can be maintained substantially equal.

3. The liquid pressure transfer method of claim 2, wherein a deflection angle defined between a plane in which the loop shaped direction extends and a relative movement direction of the transfer film is set to be within a range of plus or minus 90 degrees.

4. The liquid pressure transfer method of claim 3, wherein said downwardly immersing the loop shaped workpiece in the transfer liquid is carried out in such a manner that the transfer film laps on the workpiece while a line, which is defined on the transfer film as being normal to a direction of relative movement of the transfer film with respect to the loop shaped workpiece, substantially conforms to the circumference of the section of the workpiece in the thickness direction.

5. The liquid pressure transfer method of claim 2, wherein:
the loop shaped workpiece comprises a steering wheel component having a transfer-not-required portion;
said downwardly immersing comprises initially immersing the steering wheel component in the transfer liquid at the transfer-not-required portion; and
said moving the loop shaped workpiece in the loop shaped direction comprises rotating the steering wheel component while maintaining the attitude of the workpiece to the surface of the transfer liquid the same at the transfer initiating site during transfer of the transfer pattern.

6. The liquid pressure transfer method of claim 2, wherein:
the loop shaped workpiece comprises a steering wheel component having a front side and a rear side, the front side defined as being intended to face a driver's seat when mounted on a vehicle and the rear side defined as being substantially out of view from a driver's seat when mounted on a vehicle; and
said downwardly immersing comprises immersing the steering wheel component such that the transfer pattern is transferred to the surface of the steering wheel component with a joint line of the transfer pattern formed on the rear surface of the steering wheel component.

7. The liquid pressure transfer method of claim 2, wherein said downwardly immersing the loop shaped workpiece in the transfer liquid is carried out in such a manner that the transfer film laps on the workpiece while a line, which is defined on the transfer film as being normal to a direction of relative movement of the transfer film with respect to the loop shaped workpiece, substantially conforms to the circumference of the section of the workpiece in the thickness direction.

8. The liquid pressure transfer method of claim 1, wherein a deflection angle defined between a plane in which the loop shaped direction extends and a relative movement direction of the transfer film is set to be within a range of plus or minus 90 degrees.

9. The liquid pressure transfer method of claim 8, wherein:
the loop shaped workpiece comprises a steering wheel component having a transfer-not-required portion;
said downwardly immersing comprises initially immersing the steering wheel component in the transfer liquid at the transfer-not-required portion; and
said moving the loop shaped workpiece in the loop shaped direction comprises rotating the steering wheel component while maintaining the attitude of the workpiece to the surface of the transfer liquid the same at the transfer initiating site during transfer of the transfer pattern.

10. The liquid pressure transfer method of claim 8, wherein:
the loop shaped workpiece comprises a steering wheel component having a front side and a rear side, the front side defined as being intended to face a driver's seat when mounted on a vehicle and the rear side defined as being substantially out of view from a driver's seat when mounted on a vehicle; and
said downwardly immersing comprises immersing the steering wheel component such that the transfer pattern is transferred to the surface of the steering wheel component with a joint line of the transfer pattern formed on the rear surface of the steering wheel component.

11. The liquid pressure transfer method of claim 1, wherein:
the loop shaped workpiece comprises a steering wheel component having a transfer-not-required portion;
said downwardly immersing comprises initially immersing the steering wheel component in the transfer liquid at the transfer-not-required portion; and
said moving the loop shaped workpiece in the loop shaped direction comprises rotating the steering wheel component while maintaining the attitude of the workpiece to the surface of the transfer liquid the same at the transfer initiating site during transfer of the transfer pattern.

12. The liquid pressure transfer method of claim 11, wherein:
the steering wheel component having a front side and a rear side, the front side defined as being intended to face a driver's seat when mounted on a vehicle and the rear side defined as being substantially out of view from a driver's seat when mounted on a vehicle; and
said downwardly immersing comprises immersing the steering wheel component such that the transfer pattern is transferred to the surface of the steering wheel component with a joint line of the transfer pattern formed on the rear surface of the steering wheel component.

13. The liquid pressure transfer method of claim 1, wherein:
- the loop shaped workpiece comprises a steering wheel component having a front side and a rear side, the front side defined as being intended to face a driver's seat when mounted on a vehicle and the rear side defined as being substantially out of view from a driver's seat when mounted on a vehicle; and
- said downwardly immersing comprises immersing the steering wheel component such that the transfer pattern is transferred to the surface of the steering wheel component with a joint line of the transfer pattern formed on the rear surface of the steering wheel component.

14. The liquid pressure transfer method of claim 1, wherein said downwardly immersing the loop shaped workpiece in the transfer liquid is carried out in such a manner that the transfer film laps on the workpiece while a line, which is defined on the transfer film as being normal to a direction of relative movement of the transfer film with respect to the loop shaped workpiece, substantially conforms to the circumference of the section of the workpiece in the thickness direction.

\* \* \* \* \*